United States Patent
Pedroso et al.

(10) Patent No.: US 12,440,646 B2
(45) Date of Patent: Oct. 14, 2025

(54) CATHETER BRAID WIRE WITH VARIABLE CROSS-SECTION SHAPE

(71) Applicant: DePuy Synthes Products, Inc., Raynham, MA (US)

(72) Inventors: Pedro D. Pedroso, Parkland, FL (US); Chadwin Hanna, Jr., Gainesville, FL (US)

(73) Assignee: DePuy Synthes Products, Inc., Raynham, MA (US)

(*) Notice: Subject to any disclaimer, the term of this patent is extended or adjusted under 35 U.S.C. 154(b) by 997 days.

(21) Appl. No.: 17/517,780

(22) Filed: Nov. 3, 2021

(65) Prior Publication Data

US 2022/0143361 A1 May 12, 2022

Related U.S. Application Data

(60) Provisional application No. 63/110,613, filed on Nov. 6, 2020.

(51) Int. Cl.
   *A61M 25/00* (2006.01)

(52) U.S. Cl.
   CPC . *A61M 25/0053* (2013.01); *A61M 2205/0238* (2013.01)

(58) Field of Classification Search
   CPC .......... A61M 25/0053; A61M 25/0012; A61M 25/005; A61M 25/0054
   See application file for complete search history.

(56) References Cited

U.S. PATENT DOCUMENTS

| | | | |
|---|---|---|---|
| 2,608,124 A | | 8/1952 | Jeckel |
| 5,562,619 A | * | 10/1996 | Mirarchi ........... A61M 25/0133 |
| | | | 604/95.04 |

(Continued)

FOREIGN PATENT DOCUMENTS

| | | | |
|---|---|---|---|
| DE | 102016205642 A1 | 10/2016 | |
| EP | 3437668 A1 * | 2/2019 | ........ A61M 25/0009 |

(Continued)

OTHER PUBLICATIONS

Partial European Search Report issued in European Patent Application No. 21 20 6742 dated Sep. 6, 2022.

(Continued)

*Primary Examiner* — Bhisma Mehta
*Assistant Examiner* — Adam J. Cermak
(74) *Attorney, Agent, or Firm* — Troutman Pepper Locke LLP (57) ABSTRACT

The disclosed technology can include a catheter braid including wire segments with varying cross-section shapes. Wire segments at a proximal portion of the braid can have a substantially rectangular cross-section shape, while wire segments at a distal portion of the braid can have a substantially circular cross-section shape. The cross-section shape can gradually transition from rectangular to circular along the length of the braid. The catheter braid can include wire segments having an outer core and an inner core. The inner core at the proximal section of the braid can have a substantially rectangular cross-section shape, while the inner core at the distal portion of the braid can have a substantially circular cross-section shape. The cross-section shape of the inner core can gradually transition from rectangular to the circular to provide a smooth transition. The composition of the inner core can be varied along the length of the braid.

13 Claims, 9 Drawing Sheets

(56) References Cited

U.S. PATENT DOCUMENTS

| | | | |
|---|---|---|---|
| 5,571,161 | A | 11/1996 | Starksen |
| 6,391,037 | B1 | 5/2002 | Greenhalgh |
| 6,464,684 | B1 * | 10/2002 | Galdonik ............ A61M 25/005 |
| | | | 604/527 |
| 6,612,999 | B2 | 9/2003 | Brennan et al. |
| 7,628,806 | B2 | 12/2009 | Yampolsky et al. |
| 8,231,551 | B2 * | 7/2012 | Griffin ............. A61M 25/0013 |
| | | | 600/585 |
| 8,372,055 | B2 | 2/2013 | Thornton et al. |
| 9,232,992 | B2 | 1/2016 | Heidner |
| 9,532,792 | B2 | 1/2017 | Galdonik et al. |
| 9,532,873 | B2 | 1/2017 | Kelley |
| 9,533,344 | B2 | 1/2017 | Monetti et al. |
| 9,539,011 | B2 | 1/2017 | Chen et al. |
| 9,539,022 | B2 | 1/2017 | Bowman |
| 9,539,122 | B2 | 1/2017 | Burke et al. |
| 9,539,382 | B2 | 1/2017 | Nelson |
| 9,549,830 | B2 | 1/2017 | Bruszewski et al. |
| 9,554,805 | B2 | 1/2017 | Tompkins et al. |
| 9,561,125 | B2 | 2/2017 | Bowman et al. |
| 9,572,982 | B2 | 2/2017 | Burnes et al. |
| 9,579,484 | B2 | 2/2017 | Barnell |
| 9,585,642 | B2 | 3/2017 | Dinsmoor et al. |
| 9,615,832 | B2 | 4/2017 | Bose et al. |
| 9,615,951 | B2 | 4/2017 | Bennett et al. |
| 9,622,753 | B2 | 4/2017 | Cox |
| 9,636,115 | B2 | 5/2017 | Henry et al. |
| 9,636,439 | B2 | 5/2017 | Chu et al. |
| 9,642,675 | B2 | 5/2017 | Werneth et al. |
| 9,655,633 | B2 | 5/2017 | Leynov et al. |
| 9,655,645 | B2 | 5/2017 | Staunton |
| 9,655,989 | B2 | 5/2017 | Cruise et al. |
| 9,662,129 | B2 | 5/2017 | Galdonik et al. |
| 9,662,238 | B2 | 5/2017 | Dwork et al. |
| 9,662,425 | B2 | 5/2017 | Lilja et al. |
| 9,668,898 | B2 | 6/2017 | Wong |
| 9,675,477 | B2 | 6/2017 | Thompson |
| 9,675,782 | B2 | 6/2017 | Connolly |
| 9,676,022 | B2 | 6/2017 | Ensign et al. |
| 9,692,557 | B2 | 6/2017 | Murphy |
| 9,693,852 | B2 | 7/2017 | Lam et al. |
| 9,700,262 | B2 | 7/2017 | Janik et al. |
| 9,700,399 | B2 | 7/2017 | Acosta-Acevedo |
| 9,717,421 | B2 | 8/2017 | Griswold et al. |
| 9,717,500 | B2 | 8/2017 | Tieu et al. |
| 9,717,502 | B2 | 8/2017 | Teoh et al. |
| 9,724,103 | B2 | 8/2017 | Cruise et al. |
| 9,724,526 | B2 | 8/2017 | Strother et al. |
| 9,750,565 | B2 | 9/2017 | Bloom et al. |
| 9,757,260 | B2 | 9/2017 | Greenan |
| 9,764,111 | B2 | 9/2017 | Gulachenski |
| 9,770,251 | B2 | 9/2017 | Bowman et al. |
| 9,770,577 | B2 | 9/2017 | Li et al. |
| 9,775,621 | B2 | 10/2017 | Tompkins et al. |
| 9,775,706 | B2 | 10/2017 | Peterson et al. |
| 9,775,732 | B2 | 10/2017 | Khenansho |
| 9,788,800 | B2 | 10/2017 | Mayoras, Jr. |
| 9,795,391 | B2 | 10/2017 | Saatchi et al. |
| 9,801,980 | B2 | 10/2017 | Karino et al. |
| 9,808,599 | B2 | 11/2017 | Bowman et al. |
| 9,833,252 | B2 | 12/2017 | Sepetka et al. |
| 9,833,604 | B2 | 12/2017 | Lam et al. |
| 9,833,625 | B2 | 12/2017 | Waldhauser et al. |
| 10,480,894 | B2 | 11/2019 | Jolley et al. |
| 10,870,935 | B2 * | 12/2020 | Pilgeram ............... A61B 90/92 |
| 12,296,113 | B2 * | 5/2025 | Ito ..................... A61M 25/005 |
| 2003/0212446 | A1 | 11/2003 | Kaplan et al. |
| 2004/0089969 | A1 * | 5/2004 | Willard ............... A61M 25/005 |
| | | | 604/527 |
| 2005/0149171 | A1 | 7/2005 | McCullagh et al. |
| 2006/0064151 | A1 | 3/2006 | Guterman |
| 2008/0125752 | A1 | 5/2008 | Gunderson et al. |
| 2008/0281350 | A1 | 11/2008 | Sepetka |
| 2010/0324649 | A1 | 12/2010 | Mattsson |
| 2011/0082443 | A1 * | 4/2011 | Griffin ............... A61M 25/0045 |
| | | | 604/526 |
| 2012/0265134 | A1 * | 10/2012 | Echarri ............... A61M 25/005 |
| | | | 604/525 |
| 2012/0283768 | A1 * | 11/2012 | Cox ................... A61B 17/1219 |
| | | | 606/198 |
| 2013/0231696 | A1 | 9/2013 | Johnson et al. |
| 2014/0121758 | A1 | 5/2014 | Ferrera et al. |
| 2014/0135812 | A1 | 5/2014 | Divino et al. |
| 2014/0200607 | A1 | 7/2014 | Sepetka et al. |
| 2014/0330253 | A1 * | 11/2014 | Weiss ...................... D04C 1/02 |
| | | | 87/9 |
| 2017/0007264 | A1 | 1/2017 | Cruise et al. |
| 2017/0007265 | A1 | 1/2017 | Guo et al. |
| 2017/0020670 | A1 | 1/2017 | Murray et al. |
| 2017/0020700 | A1 | 1/2017 | Bienvenu et al. |
| 2017/0027640 | A1 | 2/2017 | Kunis et al. |
| 2017/0027692 | A1 | 2/2017 | Bonhoeffer et al. |
| 2017/0027725 | A1 | 2/2017 | Argentine |
| 2017/0035436 | A1 | 2/2017 | Morita |
| 2017/0035567 | A1 | 2/2017 | Duffy |
| 2017/0042548 | A1 | 2/2017 | Lam |
| 2017/0049596 | A1 | 2/2017 | Schabert |
| 2017/0071737 | A1 | 3/2017 | Kelley |
| 2017/0072452 | A1 | 3/2017 | Monetti et al. |
| 2017/0079671 | A1 | 3/2017 | Morero et al. |
| 2017/0079680 | A1 | 3/2017 | Bowman |
| 2017/0079766 | A1 | 3/2017 | Wang et al. |
| 2017/0079767 | A1 | 3/2017 | Leon-Yip |
| 2017/0079812 | A1 | 3/2017 | Lam et al. |
| 2017/0079817 | A1 | 3/2017 | Sepetka et al. |
| 2017/0079819 | A1 | 3/2017 | Pung et al. |
| 2017/0079820 | A1 | 3/2017 | Lam et al. |
| 2017/0086851 | A1 | 3/2017 | Wallace et al. |
| 2017/0086996 | A1 | 3/2017 | Peterson et al. |
| 2017/0095259 | A1 | 4/2017 | Tompkins et al. |
| 2017/0100126 | A1 | 4/2017 | Bowman et al. |
| 2017/0100141 | A1 | 4/2017 | Morero et al. |
| 2017/0100143 | A1 | 4/2017 | Granfield |
| 2017/0100183 | A1 | 4/2017 | Iaizzo et al. |
| 2017/0113023 | A1 | 4/2017 | Steingisser et al. |
| 2017/0147765 | A1 | 5/2017 | Mehta |
| 2017/0151032 | A1 | 6/2017 | Loisel |
| 2017/0165062 | A1 | 6/2017 | Rothstein |
| 2017/0165065 | A1 | 6/2017 | Rothstein et al. |
| 2017/0165454 | A1 | 6/2017 | Tuohy et al. |
| 2017/0172581 | A1 * | 6/2017 | Bose ................. A61B 17/1215 |
| 2017/0172766 | A1 | 6/2017 | Vong et al. |
| 2017/0172772 | A1 | 6/2017 | Khenansho |
| 2017/0189033 | A1 | 7/2017 | Sepetka et al. |
| 2017/0189035 | A1 | 7/2017 | Porter |
| 2017/0215902 | A1 | 8/2017 | Leynov et al. |
| 2017/0216484 | A1 | 8/2017 | Cruise et al. |
| 2017/0224350 | A1 | 8/2017 | Shimizu et al. |
| 2017/0224355 | A1 | 8/2017 | Bowman et al. |
| 2017/0224467 | A1 | 8/2017 | Piccagli et al. |
| 2017/0224511 | A1 | 8/2017 | Dwork et al. |
| 2017/0224953 | A1 | 8/2017 | Tran et al. |
| 2017/0231749 | A1 | 8/2017 | Perkins et al. |
| 2017/0252064 | A1 | 9/2017 | Staunton |
| 2017/0265983 | A1 | 9/2017 | Lam et al. |
| 2017/0281192 | A1 | 10/2017 | Tieu et al. |
| 2017/0281331 | A1 | 10/2017 | Perkins et al. |
| 2017/0281344 | A1 | 10/2017 | Costello |
| 2017/0281909 | A1 | 10/2017 | Northrop et al. |
| 2017/0281912 | A1 | 10/2017 | Melder et al. |
| 2017/0290593 | A1 | 10/2017 | Cruise et al. |
| 2017/0290654 | A1 | 10/2017 | Sethna |
| 2017/0296221 | A1 | 10/2017 | Di Caprio et al. |
| 2017/0296324 | A1 | 10/2017 | Argentine |
| 2017/0296325 | A1 | 10/2017 | Marrocco et al. |
| 2017/0303939 | A1 | 10/2017 | Greenhalgh et al. |
| 2017/0303942 | A1 | 10/2017 | Greenhalgh et al. |
| 2017/0303947 | A1 | 10/2017 | Greenhalgh et al. |
| 2017/0303948 | A1 | 10/2017 | Wallace et al. |
| 2017/0304041 | A1 | 10/2017 | Argentine |
| 2017/0304097 | A1 | 10/2017 | Corwin et al. |
| 2017/0304595 | A1 | 10/2017 | Nagasrinivasa et al. |
| 2017/0312109 | A1 | 11/2017 | Le |

(56) References Cited

U.S. PATENT DOCUMENTS

| | | |
|---|---|---|
| 2017/0312484 A1 | 11/2017 | Shipley et al. |
| 2017/0316561 A1 | 11/2017 | Helm et al. |
| 2017/0319826 A1 | 11/2017 | Bowman et al. |
| 2017/0333228 A1 | 11/2017 | Orth et al. |
| 2017/0333236 A1 | 11/2017 | Greenan |
| 2017/0333678 A1 | 11/2017 | Bowman et al. |
| 2017/0340383 A1 | 11/2017 | Bloom et al. |
| 2017/0348014 A1 | 12/2017 | Wallace et al. |
| 2017/0348514 A1* | 12/2017 | Guyon ............ A61M 25/10187 |
| 2018/0243530 A1* | 8/2018 | Lederman .............. A61B 5/055 |
| 2020/0094019 A1* | 3/2020 | Siess ................. A61M 25/0102 |
| 2020/0155739 A1* | 5/2020 | Siess ................... A61M 60/216 |
| 2021/0113225 A1 | 4/2021 | Marks et al. |
| 2021/0290896 A1 | 9/2021 | Tassoni, Jr. et al. |
| 2022/0125450 A1 | 4/2022 | Sirhan et al. |
| 2022/0225950 A1* | 7/2022 | Nishide ............ A61M 25/0068 |
| 2023/0047163 A1* | 2/2023 | Tal .................... A61M 25/0054 |
| 2023/0263993 A1* | 8/2023 | Valencia ........... A61M 25/0053 604/526 |
| 2023/0277804 A1* | 9/2023 | Dagan ................. A61M 25/005 604/508 |
| 2023/0302254 A1* | 9/2023 | Dagan ................. A61M 25/005 |

FOREIGN PATENT DOCUMENTS

| | | |
|---|---|---|
| JP | 2000-000309 A | 1/2000 |
| JP | 2019-176919 A | 10/2019 |
| WO | WO1998050097 A1 | 11/1998 |
| WO | 20140113821 A1 | 7/2014 |
| WO | 2023035013 A1 | 3/2023 |

OTHER PUBLICATIONS

Japanese Office Action dated Jun. 10, 2025, in corresponding JP Appln. No. 2021-180976, and submitted with English Translation.
Japanese office action dated Jun. 10, 2025, in corresponding JP Appln. 2021-180976, and submitted with English Translation.

* cited by examiner

CATHETER BRAID WIRE WITH VARIABLE CROSS-SECTION SHAPE

CROSS-REFERENCE TO RELATED APPLICATIONS

This application claims the benefit of U.S. Patent Application No. 63/110,613, filed on 6 Nov. 2020, the entire contents and substance of which is incorporated herein by reference as if fully set forth below.

FIELD OF INVENTION

This invention generally relates to devices and methods for accessing blood vessels during intravascular medical treatments. More specifically, the present disclosure relates to a catheter having improved flexibility while maintaining axial stiffness.

BACKGROUND

Catheters serve a broad range of functions in intravascular medical treatments. Catheters are typically a thin tube manufactured from medical grade materials that can be inserted into a body and can be used to deliver drugs or other devices, perform surgical procedures, remove blockages from vessels, and a variety of other purposes. By modifying the material or adjusting the way a catheter is manufactured, it is possible to tailor different sections of the catheter for particular applications.

Several designs and methods have been proposed for navigating a catheter to a target site. In one method, the catheter fits over, and is slid along, a guidewire which is used to gain access to a target site. A thin guidewire, however, almost always has more reach and distal flexibility than the catheter tube. Newer designs have been proposed which utilize various methods to alter the stiffness between the proximal and distal portions of the catheter, such as sets of polymer tubing, often with braids or windings involving wires or bands of other materials for reinforcement. Current designs can include softer, more flexible distal portions of the catheter while increasing the stiffness towards the proximal portion of the catheter. In such designs, a smooth transition from the softer, more flexible distal portion to the stiffer proximal portion can facilitate successful usage for vascular applications. However, some existing designs lack the strength to be useful for some medical procedures or contain abrupt stiffness or geometric changes which can hinder trackability, introduce significant stress concentrations, and potentially increase the likelihood of device kinking or buckling. As a result, some designs often have pushability, trackability, or kink levels which are unacceptable for wide adoption among physicians.

Thus, there is a need for systems, devices, and methods that can provide a smooth transition from a relatively stiff proximal portion to a relatively flexible distal portion of a catheter while maintaining axial stiffness.

SUMMARY

Generally, it is an object of the present invention to provide a catheter braid including wire segments with varying cross-section shapes to provide a relatively soft, flexible catheter shaft at a distal portion of the braid and relatively stiff catheter shaft at the proximal portion of the braid. In an embodiment, the wire segments at the proximal portion can have a substantially rectangular cross-section shape, while wire segments at the distal portion can have a substantially circular cross-section shape. The cross-section shape of wire segment can gradually transition from the rectangular cross-section shape to the circular cross-section shape to provide a smooth transition, thereby minimizing the potential of kinking. In an additional embodiment, the wire segments can have an outer core and an inner core. The inner core at the proximal portion of the braid can have a substantially rectangular cross-section shape, while the inner core at the distal portion of the braid can have a substantially circular cross-section shape. The cross-section shape of the inner core can gradually transition from rectangular to circular to provide a smooth transition. The composition of the outer shell can be different than the composition of the inner core, and the composition of the inner core can vary as the wire segments extend from the proximal portion to the distal portion. By varying the cross-section shape and/or composition of the inner core, the catheter can smoothly transition from a rigid and stiff shaft at the proximal portion to a soft, flexible shaft at the distal portion.

An example catheter braid can include a proximal portion with a proximal end, a distal portion with a distal end, and a length extending between the proximal and distal ends. The catheter braid can include a plurality of wire segments, each wire segment including an outer shell and an inner core. The outer shell can have a first material composition. The inner core can extend through the outer shell and can have a second material composition that is different than the first material composition over at least a portion of the length of the catheter braid. The inner core can have a first cross-section shape proximate the proximal end and a second cross-section shape proximate the distal end. The first cross-section shape can transition to the second cross-section shape along the length of the catheter braid.

The proximal portion of the catheter braid can have a first picks per inch and the distal portion of the catheter braid can have a second picks per inch. The first picks per inch can be less than the second picks per inch.

The first picks per inch can be between approximately 20 and approximately 45. The second picks per inch can be between approximately 120 and approximately 200.

The first cross-section shape can be substantially rectangular, and the second cross-section shape can be substantially circular.

The catheter braid can further include a transitional portion extending over at least a portion of the proximal portion and over at least a portion of the distal portion. The transitional portion can have a variable cross-section shape that can be substantially rectangular approximate the proximal portion and can gradually transition to be substantially circular approximate the distal portion.

The second material composition can include a first metal at the proximal portion, a second metal at the transitional portion, and a third metal at the distal portion. The first metal can have a greater stiffness than the second metal and the third metal. The second metal can have a greater stiffness than the third metal.

The inner core can be a cavity at the distal end of the distal portion.

The first-cross-section shape can be substantially rectangular, and the second cross-section shape can be substantially rectangular.

The inner core can include a first metal at the proximal portion and a second metal at the distal portion. The first metal can have a greater stiffness than the second metal.

The outer shell can include an upper semi-cylinder with respect to a longitudinal axis and a lower semi-cylinder with respect to the longitudinal axis.

The inner core can include a first metal, the upper semi-cylinder can include a second metal, and the lower semi-cylinder can include a third metal. The third metal can have a greater density than the first metal and the second metal and the first metal can have a greater density than the second metal.

The upper semi-cylinder can include one or more air channels.

Another example catheter can include a tubular body, a first braid, and a second braid. The tubular body can include a proximal portion and a distal portion. The first braid can be disposed over the proximal portion. The first braid can include a first plurality of wire segments. Each wire segment can include a first outer shell and a first inner core with a substantially rectangular cross-section shape. The second braid can be disposed over the distal portion. The second braid can include a second plurality of wire segments. Each wire segment can have a second outer shell and a second inner core with a substantially circular cross-section shape.

The first braid can have a first picks per inch and the second braid can have a second picks per inch. The second picks per inch can be greater than the first picks per inch.

The inner core of each wire segment of the second plurality of wire segments can be a cavity approximate the distal end of the distal portion.

Another example catheter braid disposed along a length of a catheter can include a proximal portion and a distal portion. The proximal portion can include wire segments having a first cross-section shape that is substantially rectangular. The distal portion can include wire segments having a second cross-section shape that is substantially circular.

The proximal portion can have a smaller picks per inch that the distal portion.

The catheter braid can further include a transitional portion disposed between the proximal portion and the distal portion. The transitional portion can have a greater picks per inch than the proximal portion and a smaller picks per inch than the distal portion.

The transitional portion can extend a length of between approximately 5 and approximately 15 centimeters and can have a variable cross-section. The variable cross-section can be substantially rectangular proximate the proximal portion and substantially circular proximate the distal portion.

The proximal portion can have a picks per inch of between approximately 20 and approximately 50, the transitional portion can have a picks per inch of between approximately 50 and approximately 90, and the distal portion can have a picks per inch of between approximately 110 and approximately 200.

Features of above example catheters are combinable according to teachings herein and/or in ways apparent to a person skilled in the pertinent art.

BRIEF DESCRIPTION OF DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 4AA is an illustration of the example braid of FIG. 2A with cross-sectional lines 4A-4A being shown;

FIG. 4BB is an illustration of the example braid of FIG. 2A with cross-sectional lines 4B-4B being shown;

FIG. 4CC is an illustration of the example braid of FIG. 2A with cross-sectional lines 4C-4C being shown;

FIG. 5BB is an illustration of the example braid of FIG. 5A with cross-sectional lines 5B-5B being shown;

FIG. 5CC is an illustration of the example braid of FIG. 5A with cross-sectional lines 5C-5C being shown;

FIG. 5DD is an illustration of the example braid of FIG. 5A with cross-sectional lines 5D-5D being shown;

DETAILED DESCRIPTION

The disclosed technology can include a catheter braid including wire segments with varying cross-section shapes over the length of the braid to provide a relatively soft, flexible shaft at the distal portion, relatively stiff shaft at the proximal portion, and a graduated transition between the flexible shaft and stiff shaft. In an embodiment, the wire segments at the proximal portion of the braid can have a substantially rectangular cross-section shape, thereby providing a rigid proximal shaft and maximizing column strength. The cross-section shape of wire segment can gradually transition from rectangular to circular to provide increased radial flexibility at the distal portion. By gradually transitioning from one cross-section shape to a different cross-section shape the potential for kinks can be reduced. In an additional embodiment, the wire segments can have an outer core and an inner core. The inner core at the proximal section of the braid can have a substantially rectangular cross-section shape, while the inner core at the distal portion of the braid can have a substantially circular cross-section shape. The cross-section shape of the inner core can gradually transition from rectangular to circular to provide a smooth transition. The composition of the outer shell can be different than the composition of the inner core, and the composition of the inner core can vary as the wire segment extends from the proximal portion to the distal portion. By varying the cross-section shape and/or composition of the inner core, the catheter can smoothly transition from a rigid and stiff shaft at the proximal portion to a soft, flexible shaft at the distal portion without sacrificing proximal shaft push efficiency.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. By "comprising" or "containing" or "including" it is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

As discussed herein, vasculature can be that of any "subject" or "patient" including of any human or animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to a human (e.g., rat, dog, pig, monkey, or the like). It should be appreciated that the subject may be any applicable human patient, for example.

As discussed herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 100%" may refer to the range of values from 90% to 110%.

As used herein, the term "substantially" in describing a geometrical property indicates a suitable dimensional tolerance that allows the part of collection of components to function for its intended purpose and the geometric property, despite deviations from a strict shape, is appropriately described as being close to the described strict shape. For instance, a "substantially" rectangular shape may deviate from a strictly rectangular shape, e.g. rounded corners, sides that are not precisely parallel, and/or corners that are not precisely 90°, where the "substantially" rectangular shape achieves similar functionality to that of a strictly rectangular shape. A "substantially" rectangular shape may close enough to a strictly rectangular shape that "rectangular" is a reasonably appropriate descriptor by the plain and ordinary meaning of the word "rectangular". A rectangle with semicircles at each short side, sometimes referred to as "stadium" shape, may be considered "substantially" rectangular as "stadium" is a less common shape descriptor compared to "rectangular" and when a feature having a "stadium" shape retains its functionality when the "stadium" shape is replaced by a "rectangular" shape.

The figures illustrate a generally hollow or tubular structure according to the present invention. When used herein, the terms "tubular" and "tube" are to be construed broadly and are not limited to a structure that is a right cylinder or strictly circumferential in cross-section or of a uniform cross-section throughout its length. For example, the tubular structure or system is generally illustrated as a substantially right cylindrical structure. However, the tubular system may have a tapered or curved outer surface without departing from the scope of the present invention.

Figure 1A:
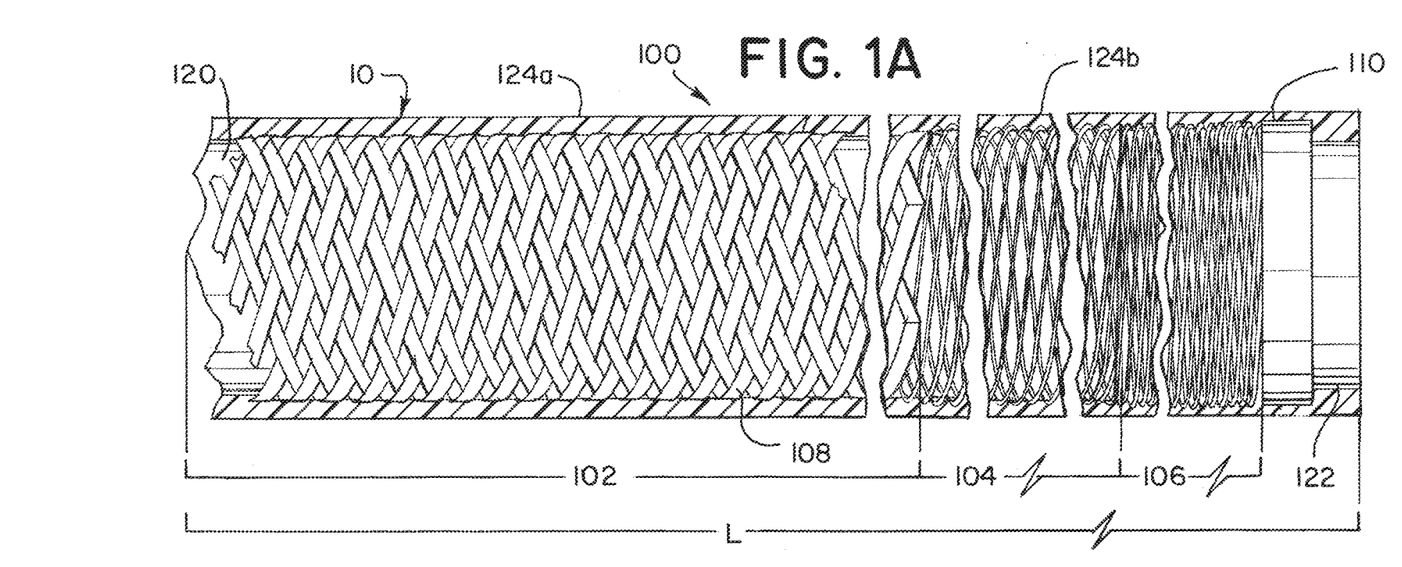
FIG. 1A is an illustration of a catheter including an example braid, according to aspects of the present invention.

Referring now to the figures, FIG. 1A illustrates a catheter 10 having a braid 100. The catheter 10 can include an elongated tubular body 120. The tubular body 120 can be made of various medical grade polymers, such as PTFE, polyether block amide (Pebax®), or Nylon. The catheter 10 can include a braid 100 disposed over the tubular body 120. The braid 100 can extend a length L. The braid 100 can extend a length L that is substantially the same as the length of the tubular body 120. Alternatively, the braid 100 can extend over a portion of the tubular body 120. The braid 100 can be a single continuous braid extending over the tubular body 120 and can have a proximal portion 102, a transitional portion 104, and a distal portion 106. By way of example, the proximal portion 102 can extend between approximately 45 centimeters to approximately 55 centimeters, the transitional portion 104 can extend between approximately 5 centimeters and approximately 15, and the distal portion 106 can extend between approximately 25 centimeters and approximately 35 centimeters.

The braid 100 can be made of a plurality of wire segments 108. The wire segments 108 can be made of a variety of metallic materials. By way of example, the wire segments 108 can be made from stainless steel, cobalt chromium, molybdenum and niobium alloy, or any other hard metal alloy. The braid 100 can have varying picks per inch along its length L. The proximal portion 102 of the braid 100 can have a low picks per inch as compared to the transitional portion 104 and the distal portion 106, thereby aiding in axial rigidity. By way of example, the proximal portion 102 can have a picks per inch of between approximately 20 and approximately 50. In order to provide increased radial flexibility proximate the distal end of the catheter 10, the picks per inch of the braid 100 can increase within the transitional portion 104 and the distal portion 106. The transitional portion 104 can have a picks per inch of between approximately 50 and approximately 90. The distal portion 106 can have a picks per inch of between approximately 110 and approximately 200, thereby providing a flexible catheter shaft that can effectively navigate through tortuous vasculature.

As further discussed herein, each wire segment of the plurality of wire segments 108 can have a first cross-section shape at the proximal portion 102 and a second cross-section shape at the distal portion 106. The transitional portion 104 can facilitate gradually transitioning the wire segments 108 from the first cross-section shape to the second cross-section shape.

The catheter 10 can further include a marker band 110 disposed proximate a tip 122 of the tubular body 120. The marker band 110 can be affixed to the tubular body 120 to provide radiopacity, thereby allowing users to precisely locate the catheter 10 within the vasculature of a patient. By way of example, the marker band 110 can be a platinum marker band.

A polymer jacket 124a can be disposed around the braid 100. A first polymer jacket 124a can be disposed around the proximal portion 102 of the braid 100. In some instances, the first polymer jacket 124a can be disposed around the proximal portion 102 and at least a portion of the transitional portion 104. The first polymer jacket 124a can be made of a material that have a hardness of between approximately 60 to approximately 80 durometers. A second polymer jacket 124b can be disposed around at least a portion of the transitional portion 104 and the distal portion 106 of the braid 100. In some instances, the second polymer jacket 124b can extend to the tubular body tip 122 and thus can cover the marker band 110. The second polymer jacket 124b can be made of a material that have a hardness of between approximately 40 to approximately 80 durometers.

Figure 1B:
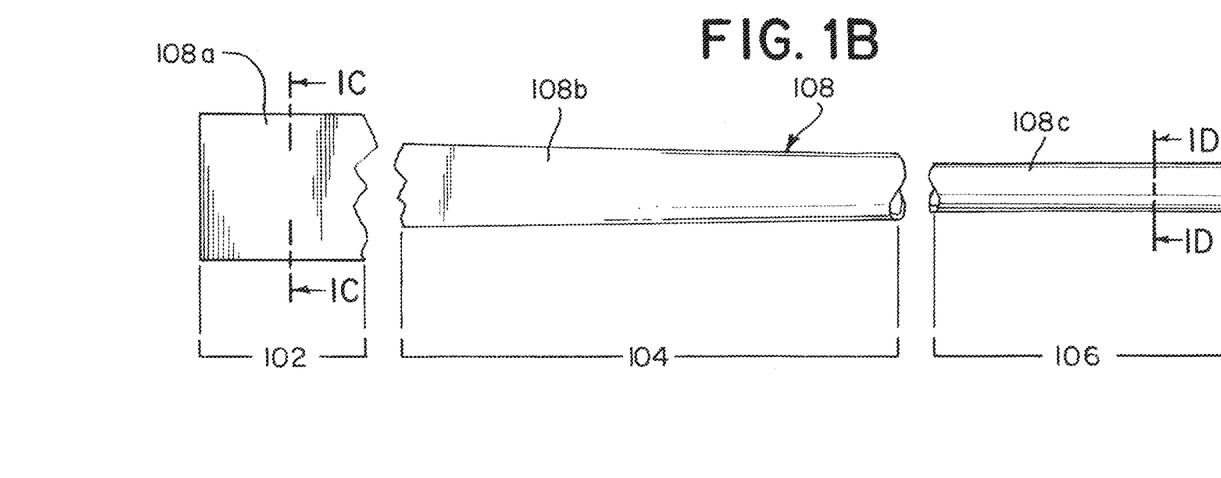
FIG. 1B is an illustration of an example wire segment of the braid of FIG. 1A, according to aspects of the present invention.
Figures 1C, 1D, 2A:
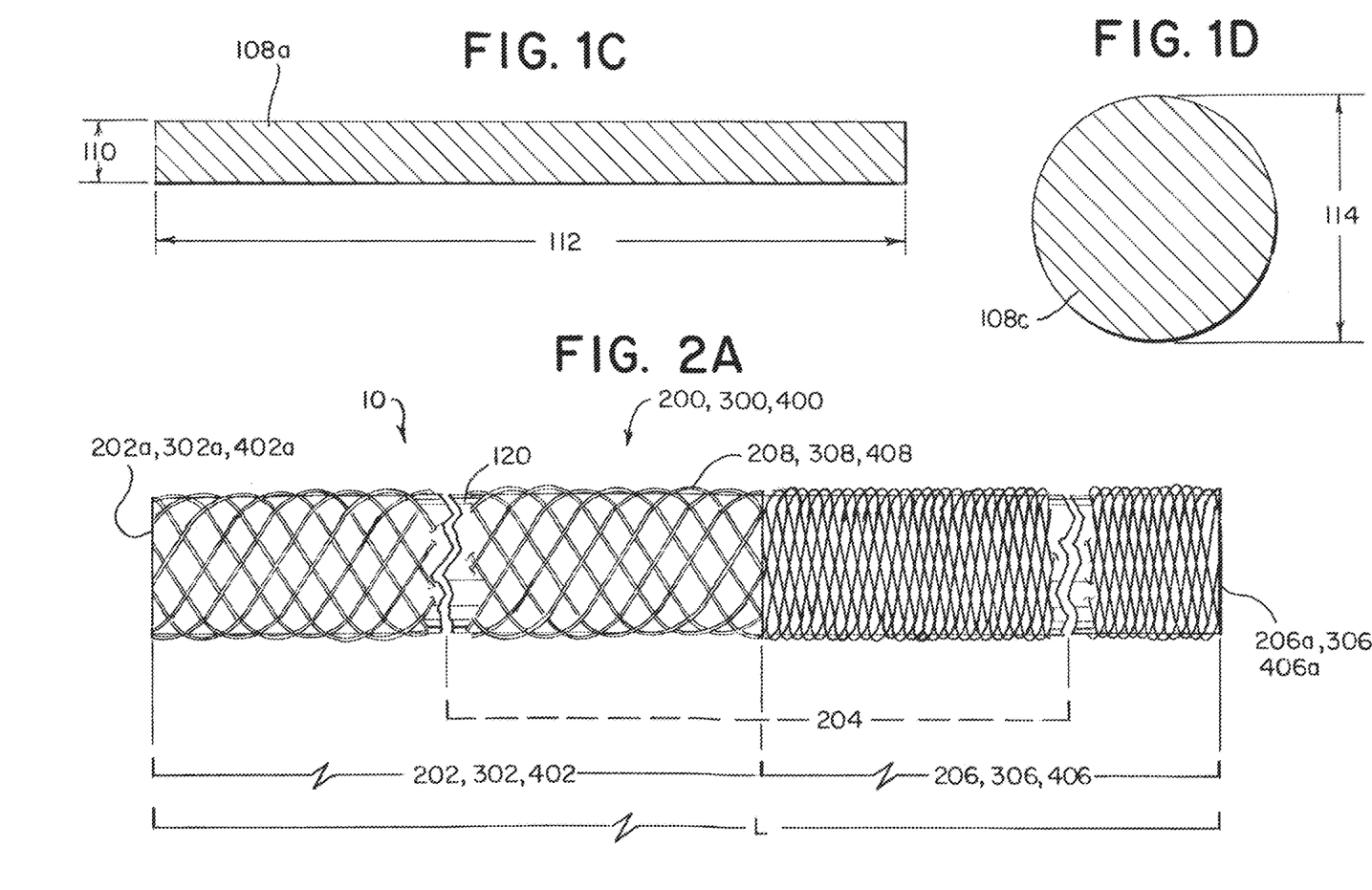
FIG. 1C is a cross-section view of the wire segment taken from line 1C-1C of FIG. 1B at a proximal portion of the example braid, according to aspects of the present invention.
FIG. 1D is a cross-section view of the wire segment taken from line 1D-1D of FIG. 1B at a distal portion of the example braid, according to aspects of the present invention.
FIG. 2A is an illustration of a catheter including an alternative example braid, according to aspects of the present invention.

FIG. 1B illustrates a wire segment 108 of the braid 100 illustrated in FIG. 1A. FIGS. 1C and 1D illustrate cross-sections of respective wire segment portions 108a, 108c of the wire segment 108 as indicated in FIG. 1B. Referring collectively to FIGS. 1A through 1D, the wire segments 108 of the braid 100 can have varying cross-sections as the braid 100 extends from its proximal portion 102 to its distal portion 106. As illustrated in FIGS. 1B and 1C, the proximal portion 102 can include the wire segment portion 108a having a substantially rectangular cross-section. The wire segment portion 108a within the proximal portion 102 of the braid 100 can be designed to maximize the width 112. By way of example, the width 112 of the wire segment portion 108a at the proximal portion 102 can be approximately 0.25 millimeters (0.01 inches). By maximizing the width 112 of the wire segment portion 108a, the resulting braid 100 can substantially resemble a metal hypotube. The wire segment portion 108a can further be designed to have a height 110 of approximately 0.01 millimeters (0.0004 inches). Accordingly, the proximal portion 102 of the braid 100 can provide sufficient column strength and axial rigidity.

As illustrated in FIGS. 1B and 1D, the distal portion 106 can include the wire segment portion 108c having a substantially circular cross-section. By way of example, the wire segment portion 108c can have a diameter 114 of approximately 0.06 millimeters (0.0025 inches). Further, when the wire segment portion 108c of the distal portion 106 are made of alloys, including stainless steel and chromium alloys, cobalt chromium alloys, and molybdenum and niobium alloys, the diameter 114 can be maintained relatively small, allowing for the overall inner diameter of the catheter 10 to be larger compared to several commercially available catheters. This can allow for an increased lumen for ancillary catheters to be translated through the catheter 10 as needed or can allow for an increased lumen for aspiration. The circular cross-section of the wire segment portion 108c can provide increased flexibility as compared to the wire segment portions 108a within the proximal portion 102. Having a flexible catheter tip can facilitate navigating the distal end of the catheter 10 through tortuous vasculature.

As illustrated in FIG. 1B, the transitional portion 104 of the braid 100 can include wire segment portion 108b having a varying cross-section shape. The wire segment portion 108b can have a substantially rectangular cross-section shape proximate the proximal portion 102 and gradually transition to a substantially circular cross-section shape proximate the distal portion 106. By gradually transitioning from the rectangular cross-section shape of the wire segment portion 108a within the proximal portion 102 to the circular cross-section shape of the wire segment portion 108c within the distal portion 106, the potential for one or more kinks can be reduced. The smooth transition can facilitate the transmission of force as the catheter 10 is pushed distally through vasculature.

By varying the cross-section shape of the braid 100 (by virtue of varying the cross-sectional shape of wires 108 of the braid 100) as the braid 100 extends along the tubular body 120 of the catheter 10, the proximal shaft of the catheter 10 can have the desired stiffness and column strength for sufficient navigation, thereby reducing the potential for damage during navigation, while the distal shaft of the catheter 10 can have the desired flexibility and trackability.

FIG. 2A illustrates the catheter 10 including an alternative example braid 200, 300, 400. FIGS. 2A through 2D illustrate the example braid 200 including a plurality of wire segments 208. FIGS. 2A and 3A through 3C illustrate the example braid 300 including a plurality of wire segments 308. FIGS. 2A and 4A and 4B illustrate the example braid 400 including a plurality of wire segments 408. Accordingly, the example braid 200, 300, 400 can be similarly disposed over the tubular body 120 of the catheter 10, however, some of the characteristics of the plurality of wire segments 208, 308, 408 can vary depending on the example braid 200, 300, 400.

The catheter 10 can include the tubular body 120. The braid 200, 300, 400 can extend a length L over the catheter 10. In some instances, the braid 200, 300, 400 can extend over a portion of the catheter 10. Alternatively, the braid 200, 300, 400 can extend over the entire length of the catheter 10. The braid 200, 300, 400 can have a proximal portion 202, 302, 402 having a proximal end 202a, 302a, 402a and a distal portion 206, 306, 406 having a distal end 206a, 306a, 406a. In particular, the braid 200 can further include a transitional portion 204 that can extend over at least a portion of the proximal portion 202 and at least a portion of the distal portion 206.

The braid 200, 300, 400 can be made of a plurality of wire segments 208, 308, 408 and can have varying picks per inch as the braid 200, 300, 400 extends the length L along the catheter 10. The proximal portion 202, 302, 402 of the braid 200, 300, 400 can have a picks per inch of between approximately 20 to approximately 45. The distal portion 206, 306, 406 of the braid 200, 300, 400 can have a picks per inch of between approximately 120 to approximately 200.

Figures 2B, 2C, 2D, 2E:
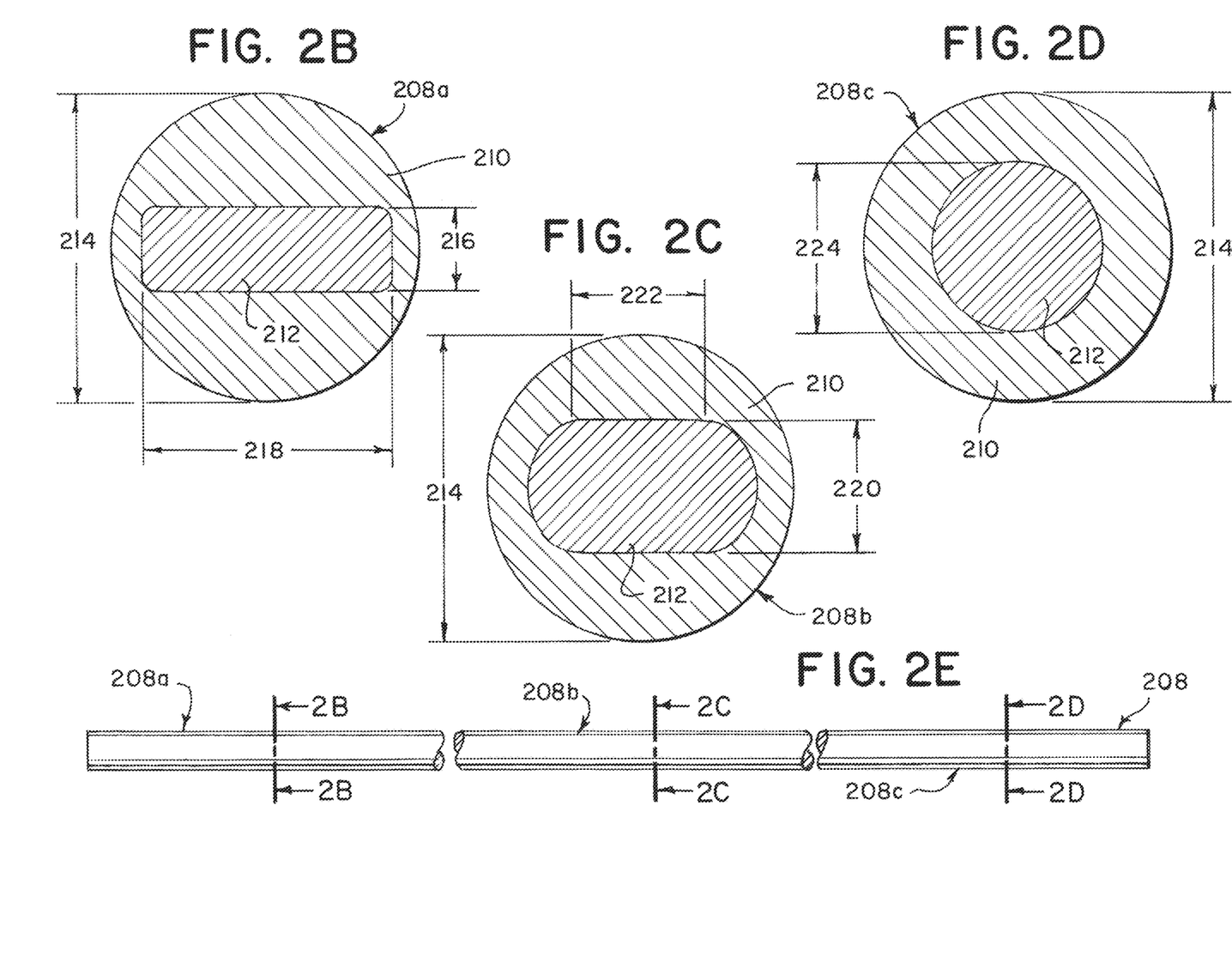
FIG. 2B is a cross-section view of a wire segment at a proximal portion of the example braid of FIG. 2A, according to aspects of the present invention.
FIG. 2C is a cross-section view of a wire segment at a transitional portion of the example braid in FIG. 2A, according to aspects of the present invention.
FIG. 2D is a cross-section view of a wire segment at a distal portion of the example braid in FIG. 2A, according to aspects of the present invention.
FIG. 2E is an illustration of the example braid of FIG. 2A with cross-sectional lines 2B-2B, 2C-2C, and 2D-2D being shown.

FIGS. 2B through 2D illustrate cross-section views of the respective wire segment portions 208a, 208b, 208c of each wire segment 208 of braid 100b. The wire segments 208 can be drawn filled tubes ("DFT") with each wire segment 208 having an outer shell 210 and an inner core 212. The outer shell 210 can have a material composition and the inner core 212 can have a material composition that is different from the material composition of the outer core 212 over at least a portion of the wire segment 208. For a portion 208c of the wire segment 208 having an inner core 212 with a circular cross-section as illustrated in FIG. 2D, the wire segment 208 can bend and flex equally in all radial directions. For portions 208a, 208b of the wire segment 208 having a non-circular inner core 212 as illustrated in FIGS. 2B and 2C, the wire segment can bend or flex in preferable directions as dictated by the non-circular shape of the inner core 212 while maintaining a circular outer profile. The first metal composition of the outer shell 210 can remain the same as the braid 100b and extends along the length L of the braid 200. The second composition of the inner core 212 can vary as the braid 200 extends from the proximal portion 202 to the distal portion 206, such that the second composition can be different than the first composition along at least a portion of the length L of the braid 200. The inner core 212 can have a varying cross-section shape as the braid 100b extends over the tubular body 120. By gradually varying the cross-section shape of the inner core 212 and/or varying the material composition of the inner core 212, the catheter 10 can have a relatively stiff proximal shaft and a relatively flexible distal shaft, thereby providing effective navigation through vasculature.

FIG. 2B, taken from cross-sectional lines 2B-2B of FIG. 2E, illustrates a cross-section view of the first wire segment portion 208a of the wire segment 208. The first wire segment portion 208a can be disposed over the proximal portion 202 of the braid 200. The first wire segment portion 208a can include the outer shell 210 and the inner core 212. The outer shell 210 can have a substantially circular cross-section. The outer shell 210 can have a diameter 214 of approximately 0.06 millimeters (0.0025 inches). Preferably, the outer shell 210 includes stainless steel and the composition of the inner core 212 includes a relatively stiff metal and/or combination of metals compared to the outer shell 210 over at the proximal portion 202 of the wire segment 208. By way of example, the inner core 212 of the first wire segment portion 208a can be made of cobalt chromium, martensitic steel, or chromium-steel. Alternatively, the outer shell 210 can be stiffer than the inner core 212 in the proximal portion 202. Overall stiffness of each segment portion 208a, 208b, 208c of the wire segment 208 can be determined based on relative cross-sectional area of the outer shell 210 compared to the inner core 212, where the material that encompasses the greatest cross-sectional area has the greatest effect on the overall stiffness of the wire segment. In examples wherein the inner core 212 has a larger cross-sectional area compared in the outer shell 210, therefore, the shape and material properties of the inner core 212 can more significantly determine overall material properties of the wire segment 208 than the outer shell 210. Relative stiffness of the outer shell 210 and the inner core 212 can be based on the Young's Modulus and/or ultimate tensile strength ("UTS") value of the metal compositions of the outer shell 210 and the inner core 212.

The inner core 212 can have a substantially rectangular cross-section shape. The inner core 212 have a length 218 that is similar to the diameter 214 of the outer shell 210 and a width 216. By way of example, the inner core 212 can have a length 218 of approximately 0.05 millimeters (0.0018 inches) and a width 216 of approximately 0.01 millimeters (0.0003 inches). Similarly, the ratio between the length 218 of the inner core to the width 216 of the inner core can be approximately 6 to 1. By having a circular outer shell 210 with an inner core 212 having a substantially rectangular cross-section shape and a relatively stiff metal composition (e.g., having a Young's Modulus and/or UTS that is substantially similar to or greater than that of the outer shell 210) can allow the wire segment portion 208a to be round wire but have similar characteristics and functionality as a flat wire. Thereby, the first wire segment portion 208a can provide increased axial rigidity and stiffness at the proximal end of the catheter 10 as compared to a catheter having entirely round wires with no inner core 212.

FIG. 2C, taken from cross-sectional lines 2C-2C of FIG. 2E, illustrates a cross-section view of the second wire segment portion 208b of the wire segment 208. The second wire segment portion 208b can be disposed over the transitional portion 204 of the braid 200. The composition of the inner core 212 in the second wire segment portion 208b can be made a second metal and/or combination of metals that is less stiff (e.g., having a lower Young's Modulus and/or UTS value) than the first metal(s) of the inner core 212 of the proximal portion, thereby increasing flexibility as the braid 100b extends along the length L of the catheter 10. The outer shell 210 can have a substantially circular cross-section with the same diameter 214 as the second wire segment portion 208a. The inner core 212 can have a varying cross-section shape. The inner core 212 can have a substantially rectangular cross-section shape proximate to the proximal portion 202 and have a substantially circular cross-section shape proximate to the distal portion 206. As illustrated in FIG. 2C, the inner core 212 can have a substantially elongated, oval or stadium shape at approximately the middle of the transitional portion 204. The length 222 of the edge of the inner core 212 be approximately 0.02 millimeters (0.00065 inches). The width 224 of the inner core 212 can be approximately 0.03 millimeters (0.0012 inches). By gradually transitioning from the rectangular cross-section shape of the wire segment portions 208a in the proximal portion 202 to the circular cross-section shape of the wire segment portions 208c in the distal portion 206, the potential for kinks can be reduced.

FIG. 2D, taken from cross-sectional lines 2D-2D of FIG. 2E, illustrates a cross-section view of the third wire segment portion 208c of the wire segment 208. The third wire segment portion 208c can be disposed over the at the distal portion 206 of the braid 100b. The outer shell 210 can maintain its substantially circular cross-section with the same diameter 214 as the first wire segment portion 208a and the second wire segment portion 208b. The composition of the inner core 212 can be a third metal and/or combination of metals that is less stiff (e.g., having a lower Young's Modulus and/or UTS value) than the second metal(s) and the first metal(s) of the inner core 212 at the transitional portion 204 and the proximal portion 202, respectively. In some instances, the inner core 212 can be a cavity or void, thereby providing enhanced flexibility of the catheter shaft at the distal portion 206. The inner core 212 can have a substantially circular cross-section. The diameter of the inner core 212 can be approximately 0.04 millimeters (0.0015 inches). The gradual transition from a relatively stiff first metal(s) at the proximal portion 202 to a relatively flexible third metal or even a cavity or void can provide a catheter 10 that can have a relatively stiff proximal shaft that can become progressive more flexible distally.

Varying the cross-section shape of the inner core 212 along the proximal portion 202, the transitional portion 204, and the distal portion 206 of the braid 200 can provide the catheter 10 with sufficient axial stiffness at the proximal end of the catheter 10 and sufficient flexibility at the distal end of the catheter 10, thereby column strength and axial rigidity is not sacrificed in order to provide a flexible catheter tip that can navigate tortuous vasculature. The gradual transition from the rectangular cross-section shape to the circular cross-section shape of the inner core 212 can further reduce the potential for kinking during navigation.

Figure 3A:
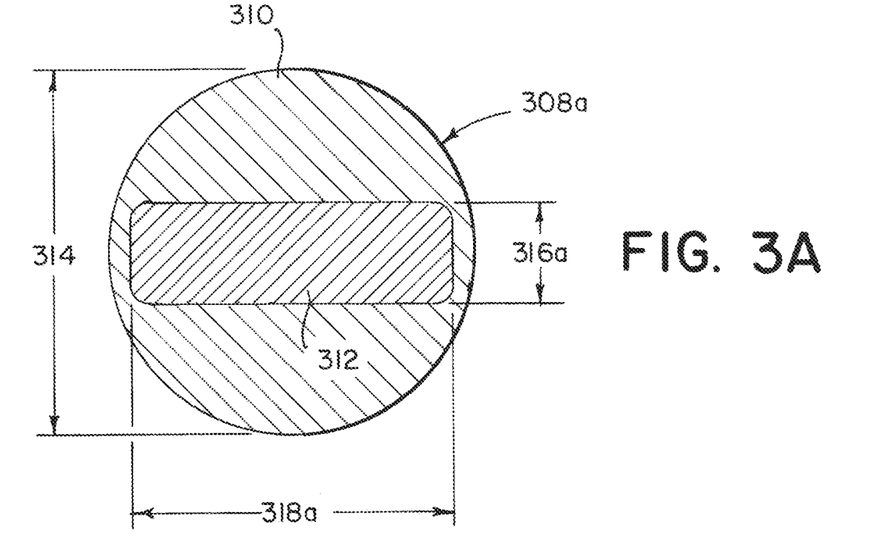
FIGS. 3A-3B are cross-section views of an alternative example wire segment of the braid in FIG. 2A, according to aspects of the present invention.
Figure 3B:
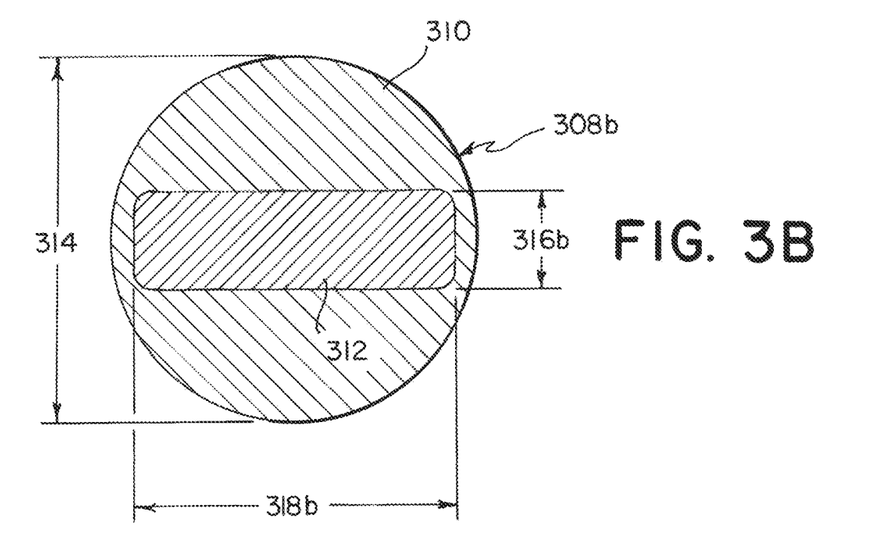
Figure 3C:
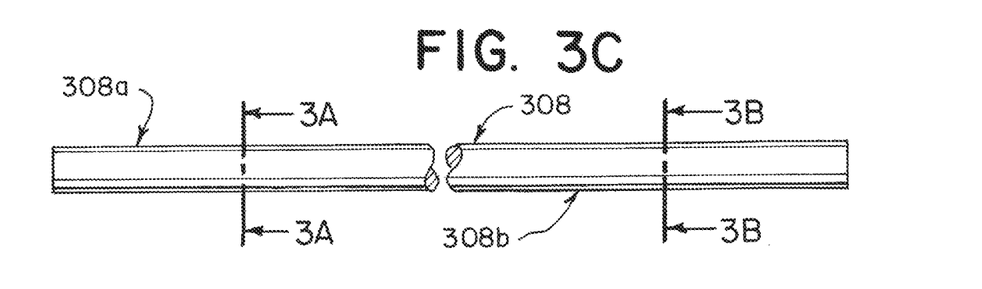
FIG. 3C is an illustration of the example braid of FIG. 2A with cross-sectional lines 3A-3A, and 3B-3B being shown.

FIGS. 3A and 3B, taken from cross-sectional lines 3A-3A and 3B-3B, respectively, of FIG. 2E, illustrate alternative example wire segments 308 of the braid 300. FIG. 3A illustrates a first wire segment portion 308a of the wire segment 308. The first wire segment portion 308a can be disposed over the proximal portion 302 of the braid 300. FIG. 3B illustrates a second wire segment portion 308b of the wire segment 308. The second wire segment portion 308b can be disposed over the distal portion 206 of the braid 300. The wire segment 308 can have the outer shell 310 and the inner core 312. As in FIGS. 2B through 2D, the outer shell 310 can have that has a substantially circular cross-section shape. The inner core 312 can be have a substantially rectangular cross-section shape at both the proximal portion 202 and the distal portion 206. Accordingly, the inner core 312 can have a substantially rectangular cross-section shape along the entire length L of the braid 300. The length 318a of the inner core 312 at the proximal portion 302 can be substantially equal to the length 318b of the inner core 312 at the distal portion 306. By way of example, the length 318a, 318b can be approximately 0.04 millimeters (0.0018 inches). Similarly, the width 316a of the inner core 312 at the proximal portion 202 can be substantially equal to the width 316b of the inner core 212 at the distal portion 206. By way of example, the width 316a, 316b can be approximately 0.01 millimeters (0.0003 inches). In this configuration, the ratio between the length 318 of the inner core to the width 316 of the inner core 312 can be approximately 6 to 1.

Although the inner core 312 of FIGS. 3A and 3B has a constant rectangular cross-section shape, the inner core 312 of the first wire segment portion 308a at the proximal portion 302 of the braid 300 can include one metal or metals while the inner core 312 of the second wire segment portion 308b at the distal portion 306 of the braid 300 can include a different metal or metals. The inner core 312 of the first wire segment portion 308a can include a metal or a combination of metals that is stiffer and can provide increased column strength to the catheter 10 as compared to the inner core 312 of the second wire segment portion 308b. The second wire segment portion 308b can include a metal or a combination of metals having a Young's Modulus and/or ultimate tensile strength ("UTS") that is less than the metal or combination of metals of the first wire segment portion 308a. By way of example, the second wire segment portion 308b can include nitinol, titanium, austenitic steels, and/or stainless steel, whereas the first wire segment portion 308a can include martensitic steels, stainless steel, tantalum, tungsten, molybdenum, rhenium, and/or cobalt chromium alloys. In this configuration, the braid 300 can provide increasing flexibility to the distal end of the catheter 10 by varying the metal composition of the inner core 312 as the braid 300 extends along the length of the catheter 10.

Figure 4:
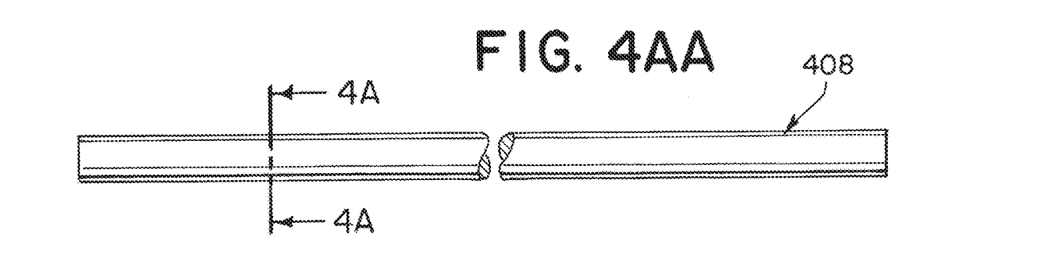
Figures 4, 4C, 5A:
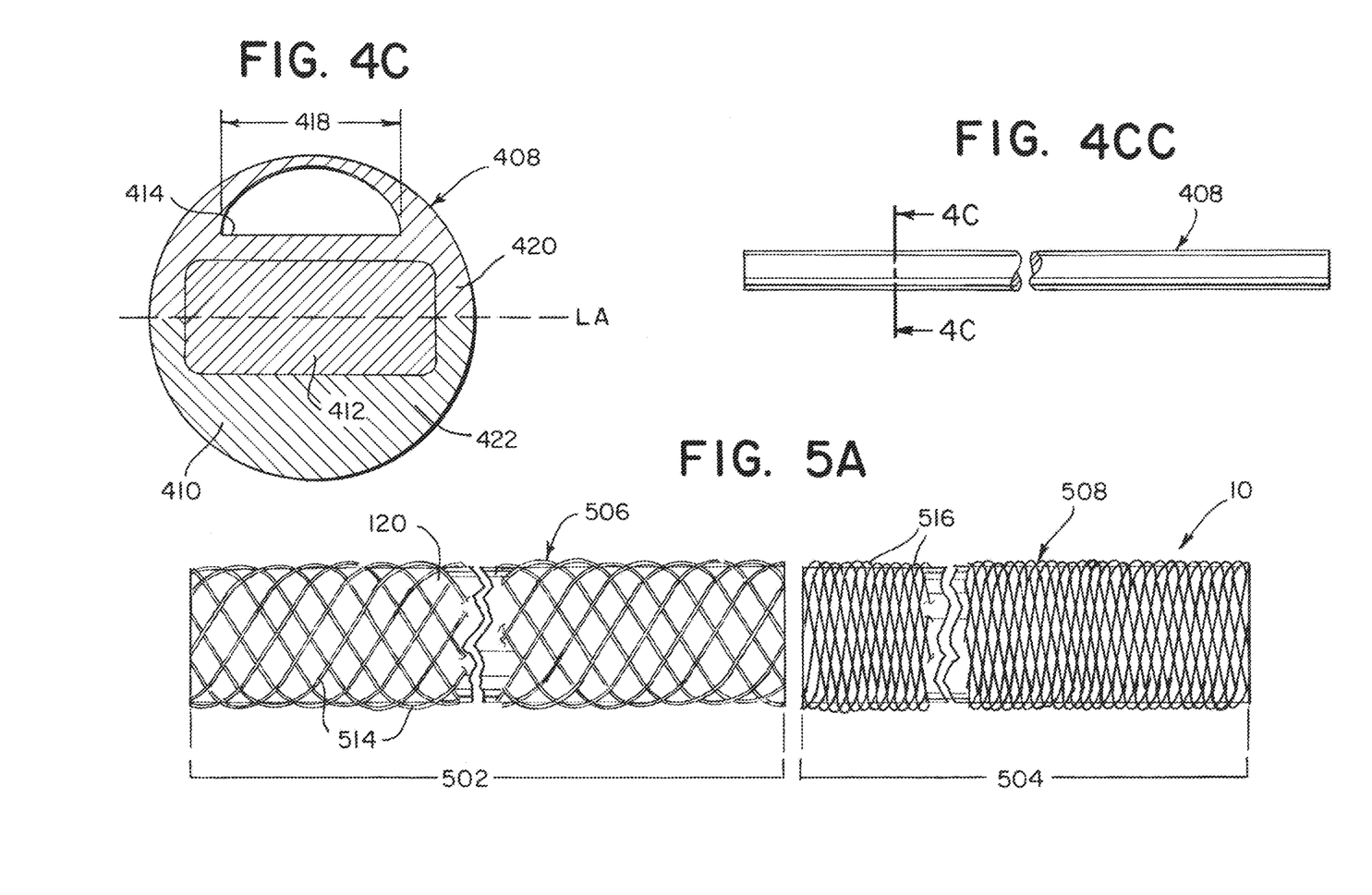
FIGS. 4A-4C are cross-section views of an alternative example wire segment of the braid in FIG. 2A, according to aspects of the present invention.
FIG. 5A is an illustration of a catheter including a first braid and a second braid, according to aspects of the present invention.
Figure 4A:
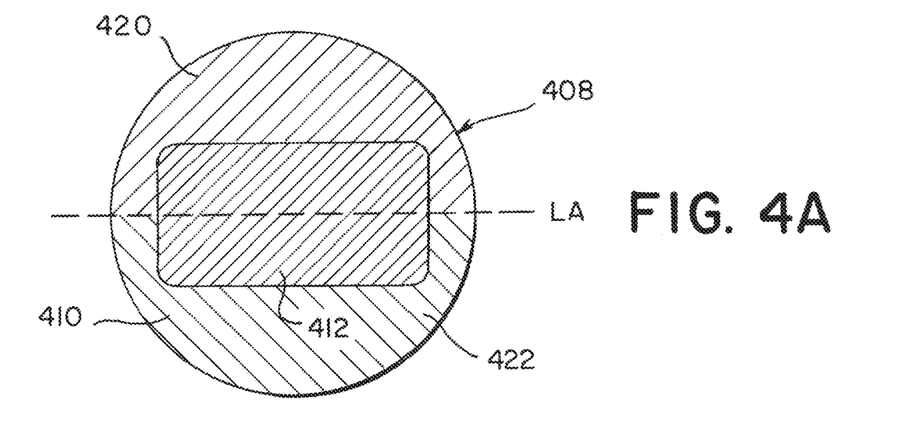
Figure 4B:
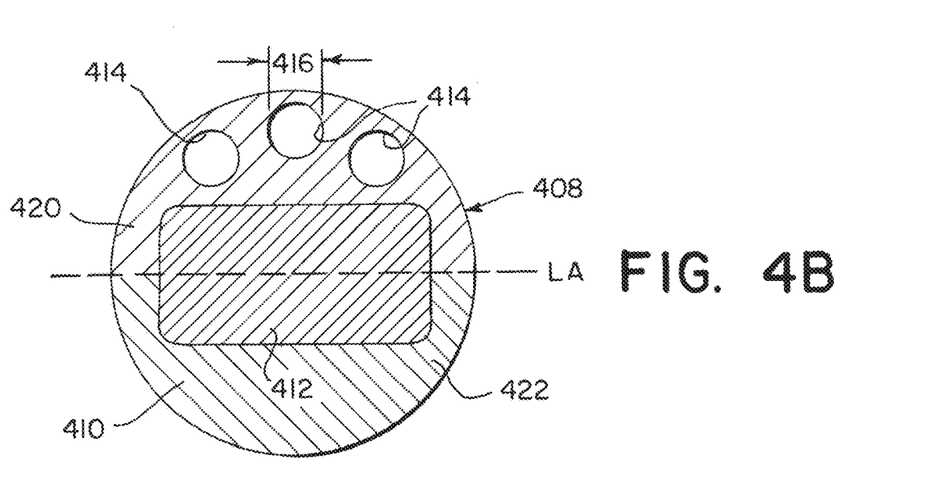

FIGS. 4A through 4C, taken from cross-sectional lines 4A-4A of FIG. 4AA, 4B-4B of FIG. 4BB, and 4C-4C of FIG. 4CC, respectively, illustrate an additional example of wire segments 408 of braid 400. In FIGS. 4A through 4C, the outer shell 410 is divided into an upper semi-cylinder 420 and a lower semi-cylinder 422 with respect to a longitudinal axis LA. The upper semi-cylinder 420 can include a first metal and/or first combination of metals and the lower semi-cylinder 422 can include a second metal and/or a second combination of metals. The second metal and/or second combination of metals in the lower semi-cylinder 422 can have a greater density than the first metal and/or first combination of metals. Thereby, the wire segment 408 can automatically rotate and position itself such that the lower semi-cylinder 422 of the wire segment 408 can be directed towards the inner lumen of the braid 400. In this configuration, the potential for twisting of the wire segments 408 during braiding can be reduced. The inner core 412 can be made of a metal(s) having a different density than both the first metal and/or first combination of metals of the upper semi-cylinder 420 and the second metal and/or second combination of metals of the lower semi-cylinder 422. The inner core 412 can be made of a metal(s) that has a greater density than the first metal and/or combination of metals and a smaller density than the second metal and/or combination of metals.

In order to further prevent twisting of the wire segment 408 by manipulating the density relationship of the first metal of the upper semi-cylinder 420, the second metal of the lower semi-cylinder 422, and the metal composition of the inner core 412, one or more air channels 414 can be created within the upper semi-cylinder 420. Any number of air channels 414 can be created within the upper semi-cylinder 420. The air channels 414 can have any shape. As illustrated in FIG. 4B, the upper semi-cylinder 420 can include three air channels 414 having a circular cross-section. The air channels 414 can have a diameter 416 of approximately 0.01 millimeters (0.00045 inches). As illustrated in FIG. 4C, the upper cylinder 420 can include one air channel 414 having a substantially semi-circle cross-section shape such that the air channel 414 can resemble the shape and/or size of the upper semi-cylinder 420. The semi-circular air channel 414 can have a diameter 418 of approximately 0.05 millimeters (0.002 inches).

By incorporating one or more air channels 414 as illustrated in FIGS. 4B and 4C, the difference in densities between the upper semi-cylinder 420 and the lower semi-cylinder 422 can be further distinguished, thereby additionally biasing the wire segment 408 to be positioned such that the lower semi-cylinder 422 is directed towards the inner lumen of the braid 400 to prevent twisting during braiding.

Figure 5:
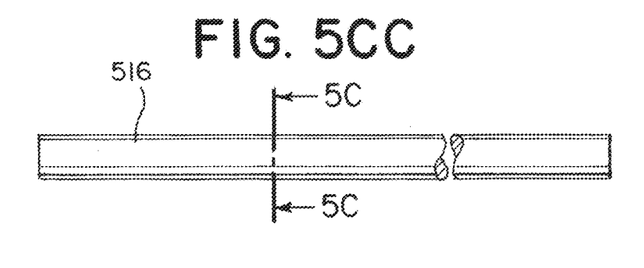
Figure 5B:
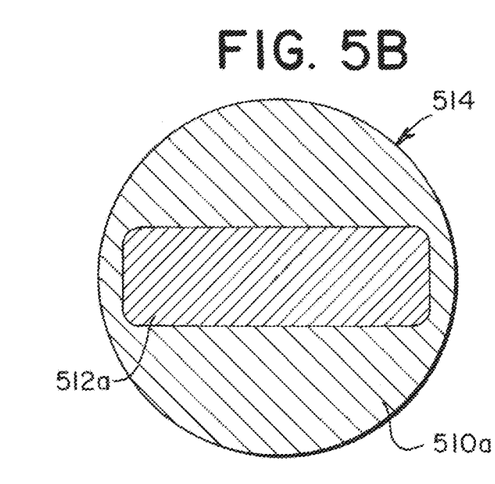
FIG. 5B is a cross-section view of a wire segment of the first braid in FIG. 5A, according to aspects of the present invention.
Figure 5C:
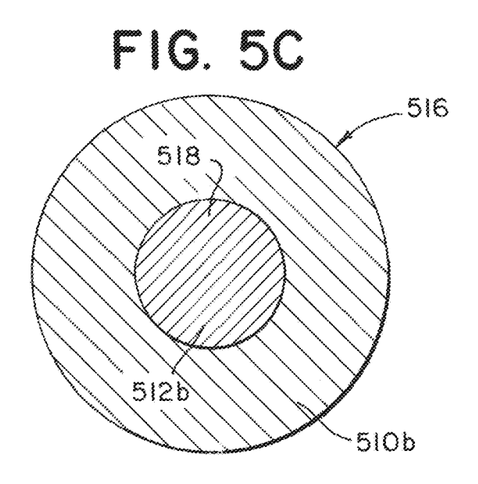
FIGS. 5C-5D are cross-section views of a wire segment of the second braid in FIG. 5A, according to aspects of the present invention.
Figure 5D:
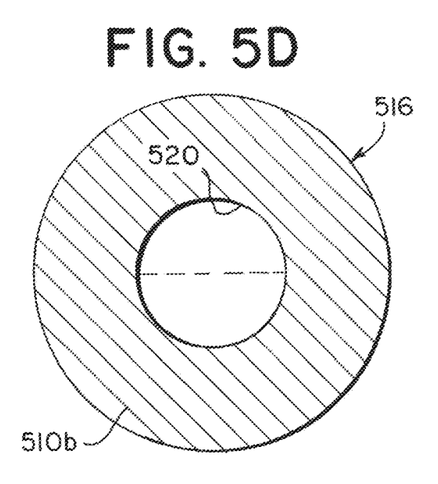

FIGS. 5B through 5DC, are taken from cross-sectional lines 5B-5B of FIG. 5BB, 5C-5C of FIG. 5CC, and 5D-5D of FIG. 5DD, respectively. FIG. 5A is an illustration of the catheter 10 including a first braid 506 and a second braid 508. In this configuration, the first braid 506 and the second braid 508 can be used as alternative wire braids in place of the braids 100, 200, 300, 400 as illustrated in FIGS. 1A through 4C. The catheter 10 can include a tubular body 120. The tubular body 120 can have a proximal portion 502 and a distal portion 504. The first braid 506 can be disposed over the proximal portion 502 of the tubular body 120 and the second braid 508 can be disposed over the distal portion 504 of the tubular body 120.

The first braid 506 can be made of a first plurality of wire segments 514 and the second braid 508 can be made of a second plurality of wire segments 516. The first braid 506 can be constructed to have a smaller picks per inch than the second braid 508. By way of example, the first braid 506 can have a picks per inch of between approximately 20 and approximately 45 and the second braid 508 can have a picks per inch of between approximately 120 and approximately 200.

The first braid 506 and the second braid 508 can be disposed over the tubular body 120 such that any gap between the first braid 506 and the second braid 508 is minimal, as a gap can cause potential kink points. In one example, the first braid 506 and the second braid 508 can abut one another, such that the first braid 506 transitions into the second braid 508, and accordingly the first plurality of wire segments 514 transition into the second plurality of wire segments 516. Alternatively, the first braid 506 and the second braid 508 can overlap. By way of example, the distal end of the first braid 506 can overlap with the proximal end of the second braid 508. Such overlap of the first braid 506 and the second braid 508 can eliminate a gap between the two braids 506, 508, and thus, decrease the chance for kink points and unsuccessful delivery of the catheter 10 to the proper location.

FIG. 5B illustrates a cross-section view of a wire segment 514 of the first braid 506. As illustrated in FIGS. 2B through 4C, the wire segment 514 can include a first outer shell 510a having the substantially circular cross-section shape. The wire segment 514 can have a first inner core 512a that can have a substantially rectangular cross-section shape. The first inner core 512a of the wire segment 514 can have a composition including a first metal. The first metal can be a relatively stiff metal (e.g., cobalt chromium, martensitic steel, chromium steel).

FIG. 5C illustrates a cross-section view of a wire segment 516 of the second braid 508. The wire segment 516 can also have a second outer shell 510b having the substantially circular cross-section shape. However, unlike the first braid 506, the wire segment 516 can have a second inner core 512b having a substantially circular cross-section shape. The second inner core 512b of the wire segment 516 can have a composition including a second metal that is less stiff than the first metal of the inner core 512b of the wire segment 514. As illustrated in FIG. 5D, in some examples, the second inner core 512b of the wire segment 516 can be an air cavity 520, such that the second inner core 512b does not contain any metal.

By varying the cross-section shape and metal composition of the inner core 512 with respect to the first braid 506 disposed over the proximal portion 502 of the tubular body 120 and the second braid 508 disposed over the distal portion 504 of the tubular body 120, the catheter 10 can have a relatively flexible distal shaft and a relatively stiff proximal shaft, thereby the catheter 10 does not have to sacrifice column strength in order to have the necessary flexibility to navigate tortuous vasculature.

Figure 6:
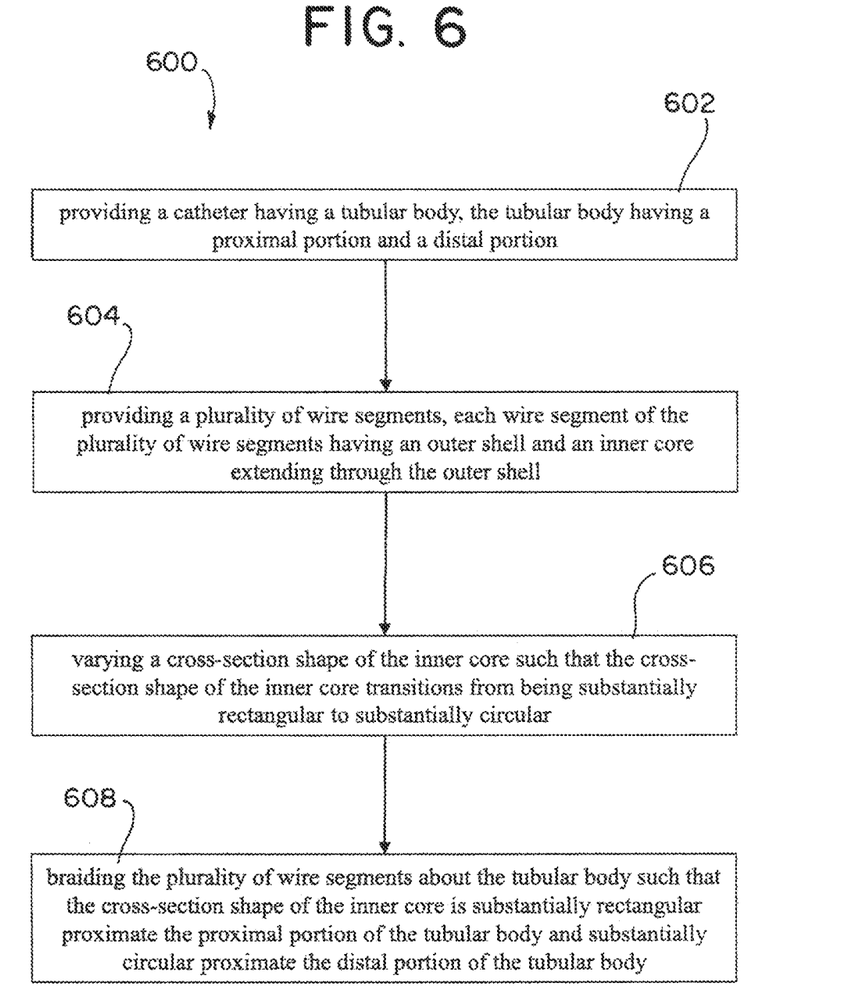
FIG. 6 is a flow diagram outlining an example method of manufacturing an example braid.

FIG. 6 illustrates a flow chart outlining an example method 600 of manufacturing a catheter braid 200. In step 602, a catheter 10 having a tubular body 120 is provided. The tubular body can have a proximal portion and a distal portion.

In step 604, a plurality of wire segments 208 can be provided. Each wire segment of the plurality of wire segments 208 can have an outer shell 210 and an inner core 212 extending through the outer shell 210.

In step 606, a cross-section shape of the inner core 212 can be varied such that the cross-section shape of the inner core 212 transitions from being substantially rectangular to substantially circular.

In step 608, the plurality of wire segments 208 can be braided about the tubular body 120 such that the cross-section shape of the inner core 212 is substantially rectangular proximate the proximal portion of the tubular body 120 and substantially circular proximate the distal portion of the tubular body 120.

Figure 7:
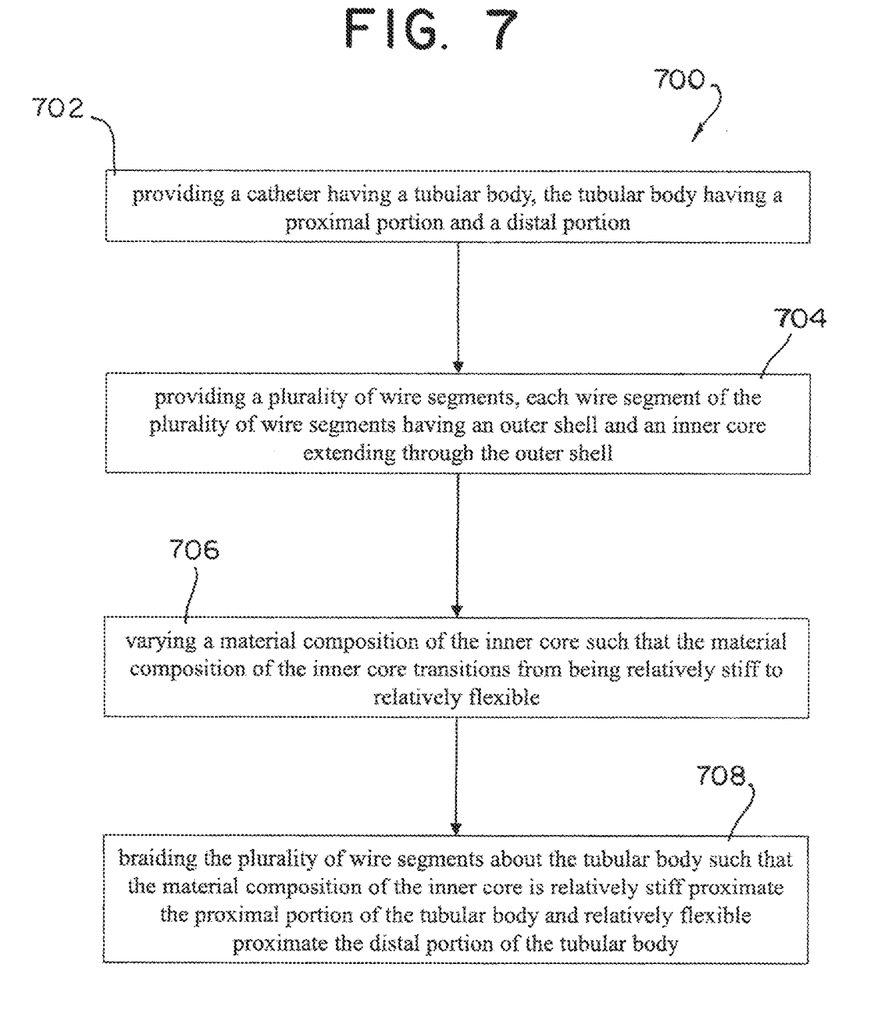
FIG. 7 is a flow diagram outlining an additional or alternative method of manufacturing an example braid.

FIG. 7 illustrates a flow chart outlining an additional and/or alternative example method 700 of manufacturing a catheter braid 200, 300. In step 702, a catheter 10 having a tubular body 120 is provided. The tubular body can have a proximal portion and a distal portion.

In step 704, a plurality of wire segments 208, 308 can be provided. Each wire segment of the plurality of wire segments 208, 308, 408 can have an outer shell 210, 310 and an inner core 212, 312, extending through the outer shell 210, 310.

In step 706, a material composition of the inner core 212, 312 can be varied such that the material composition of the inner core 212, 312 transitions from being relatively stiff to relatively flexible. For example, the material composition of the inner core 212, 312 can include varying metals create a wire segment 208, 308 having varying stiffness.

In step 708, the plurality of wire segments 208, 308 can be braided about the tubular body 120 such that the cross-section shape of the inner core 212, 312 is relatively stiff proximate the proximal portion of the tubular body 120 and relatively flexible proximate the distal portion of the tubular body 120.

The descriptions contained herein are examples of embodiments of the invention and are not intended in any way to limit the scope of the invention. As described herein, the invention contemplates many variations and modifications of the inventive delivery and release system for a vascular occlusion device, including numerous configurations, numerous stiffness properties and methods for delivering the same. Also, there are many possible variations in the materials and configurations of the release mechanism. These modifications would be apparent to those having ordinary skill in the art to which this invention relates and are intended to be within the scope of the claims which follow.

What is claimed is:

1. A catheter braid having a proximal portion with a proximal end and a distal portion with a distal end and extending a length, the catheter braid comprising a plurality of wire segments, each wire segment comprising:
   an outer shell having a first material composition; and
   an inner core extending through the outer shell and having a second material composition that is different than the first material composition over at least a portion of the length, the inner core having a first cross-section shape proximate the proximal end and a second cross-section shape proximate the distal end, the first cross-section shape transitioning to the second cross-section shape along the length;
   wherein the inner core is distally followed by a cavity at the distal end of the distal portion.

2. The catheter braid of claim 1, wherein the proximal portion has a first picks per inch and the distal portion has a second picks per inch, the first picks per inch being less than the second picks per inch.

3. The catheter braid of claim 2, wherein the first picks per inch is between approximately 20 and approximately 45 and the second picks per inch is between approximately 120 and approximately 200.

4. The catheter braid of claim 1, wherein the first cross-section shape is substantially rectangular, and the second cross-section shape is substantially circular.

5. The catheter braid of claim 1, further comprising a transitional portion extending over at least a portion of the proximal portion and over at least a portion of the distal portion, the transitional portion having a variable cross-section shape, the variable cross-section shape being substantially rectangular proximate the proximal portion and gradually transitioning to being substantially circular proximate the distal portion.

6. The catheter braid of claim 5, wherein the second material composition comprises a first metal at the proximal portion, a second metal at the transitional portion, and a third metal at the distal portion, the first metal having a greater stiffness than the second metal and the third metal, and the second metal having a greater stiffness than the third metal.

7. The catheter braid of claim 1, wherein the first cross-section shape is substantially rectangular, and the second cross-section shape is substantially rectangular.

8. The catheter braid of claim 7, wherein the inner core comprises a first metal at the proximal portion and a second metal at the distal portion, the first metal having a greater stiffness than the second metal.

9. The catheter braid of claim 7, wherein the outer shell comprises an upper semi-cylinder with respect to a longitudinal axis and a lower semi-cylinder with respect to the longitudinal axis.

10. The catheter braid of claim 9, wherein the inner core comprises a first metal, the upper semi-cylinder comprises a second metal, and the lower semi-cylinder comprises a third metal, the third metal having a greater density than the first metal and the second metal, and the first metal having a greater density than the second metal.

11. The catheter braid of claim 9, wherein the upper semi-cylinder comprises one or more air channels.

12. A catheter comprising:
a tubular body comprising a proximal portion and a distal portion;
a first braid disposed over the proximal portion, the first braid comprising a first plurality of wire segments, each wire segment having a first outer shell and a first inner core with the first inner core having a substantially rectangular cross-section shape; and
a second braid disposed over the distal portion, the second braid comprising a second plurality of wire segments, each wire segment having a second outer shell and a second inner core with the second inner core having a substantially circular cross-section shape;
wherein the second inner core of each wire segment of the second plurality of wire segments is distally followed by a cavity proximate a distal end of the distal portion.

13. The catheter of claim 12, wherein the first braid has a first picks per inch and the second braid has a second picks per inch, the second picks per inch being greater than the first picks per inch.

* * * * *